(12) United States Patent
Cabello-Fuentes

(10) Patent No.: US 6,585,900 B2
(45) Date of Patent: Jul. 1, 2003

(54) PROCESS FOR THE TREATMENT OF SLUDGE

(76) Inventor: José Cabello-Fuentes, Calle 8 Lote 3ª Manzana 26, Colonia Petrolera, Minatitlán, Veracruz, C.P. (MX), 96850

( * ) Notice: Subject to any disclaimer, the term of this patent is extended or adjusted under 35 U.S.C. 154(b) by 3 days.

(21) Appl. No.: 09/773,110

(22) Filed: Jan. 31, 2001

(65) Prior Publication Data

US 2002/0100735 A1 Aug. 1, 2002

(51) Int. Cl.⁷ .................................................. C02F 11/14
(52) U.S. Cl. ...................... 210/764; 210/771; 210/916; 210/765; 71/13; 71/28; 71/61; 423/244.01
(58) Field of Search .............................. 71/12, 13, 28, 71/29, 61; 210/609, 631, 710, 724, 725, 768, 770, 764, 916, 771, 765; 423/244.01

(56) References Cited

U.S. PATENT DOCUMENTS

| | | | | |
|---|---|---|---|---|
| 2,723,954 A | * | 11/1955 | Young | 210/770 |
| 3,655,395 A | * | 4/1972 | Karnemaat | 210/764 |
| 3,932,166 A | * | 1/1976 | Vignovich et al. | 562/475 |
| 4,038,180 A | * | 7/1977 | Talbert | 210/771 |
| 4,081,366 A | * | 3/1978 | O'Donnell | 210/725 |
| 5,232,596 A | * | 8/1993 | Castaldi | 210/603 |
| 5,411,568 A | * | 5/1995 | Moore | 71/22 |
| 5,422,015 A | * | 6/1995 | Angell et al. | 106/708 |
| 5,428,906 A | * | 7/1995 | Lynam et al. | 110/224 |
| 5,443,613 A | * | 8/1995 | Robinson | 71/12 |
| 5,976,211 A | * | 11/1999 | Fjelldal et al. | 71/11 |
| 5,984,992 A | * | 11/1999 | Greer et al. | 71/11 |
| 6,398,840 B1 | * | 6/2002 | Orta-Castro et al. | 210/609 |

* cited by examiner

*Primary Examiner*—Peter A. Hruskoci
(74) *Attorney, Agent, or Firm*—Abelman, Frayne & Schwab

(57) ABSTRACT

A process for the treatment of sludge which produces a dry sludge free of pathogenic and non-pathogenic microorganisms enriched with nitrogen which can be used as a fertilizer, and which uses as raw materials: elemental sulfur, formaldehyde, ammonia, urea, chlorine, and sulphuric acid, and comprises the steps of feeding the sludge into a pre-dryer into which is fed a hot gas stream containing sulfur trioxide produced by the combustion and catalytic oxidation of sulfur with air and finally completely drying the sludge by feeding it into an ammoniator.

11 Claims, No Drawings

PROCESS FOR THE TREATMENT OF SLUDGE

BACKGROUND OF THE INVENTION

The present invention is related to processes for the treatment of sludge issuing from water treatment plants and, more particularly, to a process for the treatment of sludge which conforms to the environmental laws and by means of which there is obtained a dry sludge free of pathogenic and non-pathogenic microorganisms enriched with nitrogen which can be used as a fertilizer.

FIELD OF THE INVENTION

In a waste water treatment plant, the effluent of the aerobic oxidation reactors is normally received by clariflocculator equipment, from the bottom of which there is extracted coagulated sludge having a solids content of approximately between about 1.5% and 2.0% and a water content of between about 98% to 98.5%, and from the top of which there is continuously spilled the so called "grey" waters.

The coagulated sludge extracted from the clariflocculator is sent to a filtration or centrifuge dewatering system in order to reduce its water content to about 82% to about 85%.

The resultant sludge has a high bacteriological content comprising pathogenic and nonpathogenic microorganisms which are highly polluting to the environment. Therefore, legislation has been enacted to provide for the disposal of sludge so there is no sanitary means damage to the environment.

In view of the above, the humid sludge must be submitted to treatment processes such as land fill, pasteurization processes, incineration etc., which have the purpose of eliminating all the pathogenic and non-pathogenic microorganisms contained in the sludge.

The disposition of the sludge is a complex and problematic task, which is accomplished by use of the following processes:

a) Land Fill.

This process consists of confining the sludge in a field having the following characteristics: a low permeability, absence of geological faults, very low volumes of rainfall, and remote from towns and cities in order to avoid the pollution of the aquiferous layers with possible leaks of polluted liquid from the land fill.

Obviously, before the disposition of the sludge in the field, the surface of the field must be sealed with a waterproof and flexible plastic film, and after the deposit of each sludge layer, a very thick soil layer must be applied.

Among some of the disadvantages of the above referred process are: its high investment cost, its high operating cost and its lack of profitability.

b) Pasteurization Process and Compost Production.

This process comprises the steps of mixing the sludge with pasture; heating the resultant mix with steam and fast cooling the heated mix in order to eliminate all the pathogenic microorganisms contained in the sludge and to obtain a fertilizer called "compost" which is free of any bacteriological polluting agent.

However, this process is recommended for use in low capacity wastewater treatment plants, in order to apply the produced compost to the cultivation of land in the proximity of the treatment plant due to its high transportation cost and low selling price which makes the transportation of the compost to locations remote from the plant unprofitable.

c) Rotary Dryers

The sludge drying process produces a good quality fertilizer having an average commercial value, due to its high content of organic compounds and nutrients such as nitrogen, phosphorous and potassium, which result from the elimination of a large percentage of the water contained in the sludge. This nutrient content can be raised to a total of 6.5% if expressed as N, $P_2O_5$ and $K_2O$ (the fertilizers by definition, must contain 20% minimum of such nutrients).

Even though the sludge drying process produces a product having an average commercial value is obtained, and that by said process the bacteriological pollution problem is solved, the significant amount of fuel used to generate the heat needed for the drying process, represents a high cost. Therefore, said process requires high investment costs and has very high operational costs, which make this process unprofitable for treating small quantities of sludge.

d) Sludge Incineration.

The sludge incineration process, has some advantages when compared with the sludge drying process. During the incineration, the combustion heat of the organic matter contained in the sludge is used, thus decreasing the energy consumption and, furthermore, the air volumes to be heated and moved are significantly smaller which constitute an additional energy consumption decrease.

The main disadvantages of the sludge incineration process are related to the drying of the sludge, mainly because of the following problems: the investment, operation and maintenance costs of the incineration step are higher than the costs of the drying step, furthermore, the incineration process is highly polluting to the environment, because the gaseous effluents produced by the incinerator are very acidic, and contain very toxic metallic compounds such as lead, arsenic, cadmium and mercury (normally present in the urban wastewater), which are considered as being very dangerous to the environment and to the health of humans and animals. Additionally, the disposition of the ashes generated by the incinerator and recollected in the ash separator, have the same polluting agents as the gaseous effluents and therefore the use of said ashes for the production of cement, for example, is very restrained.

e) Sludge Drying Beds.

Drying beds are the most widely used method of sludge dewatering in the United States. Sludge drying beds are typically used to dewater digested sludge. After drying the sludge, it is removed and either disposed of in a land fill. The most commonly used type of dry bed is the sand drying beds, which are generally used for small and medium-sized communities. In a typical sand drying bed, sludge is placed on the bed in a 20 to 30 cm layer and allowed to dry. Although the principal advantage of the drying bed is its low cost, there are highly pollutant to the environment and the dry product can not be used due to its high content of polluting agents such as bacteria and viruses.

f) Lime Stabilization.

In the lime stabilization process, lime is added to untreated sludge in sufficient quantity to raise the pH to 12 or higher. The pH creates an environment that is not conducive to the survival of microorganisms. Consequently, the sludge will not putrefy or create odors so long as the pH is maintained at this level. However, lime stabilization does not destroy the organics necessary for bacterial growth. Therefore the sludge cannot be used and must be treated with an excess of lime or disposed of before the pH drops significantly.

g) Ocean Disposal.

The Ocean disposal is highly polluting and therefore less and less acceptable by the governments of most countries.

h) Other Processes.

Some investigators have studied and developed some new processes by which interesting results are obtained. For example, by mixing the sludge with construction cement powder and processing the mix inside a granulation machine, granules of fertilizer are obtained which are useful for certain acidic soils such as those predominating in Europe or at the coasts of the Gulf of Mexico.

In order to solve the above-referenced problems, research was conducted to find a new technologic route which besides complying with the rules of the environmental laws, it would generate a product having a sufficiently high commercial value as to sell product and to recover the investment at commercial interest rates and at short term.

There has been developed a process for the treatment of sludge which uses as raw materials: elemental sulfur, formaldehyde, ammonia, urea, chlorine, and sulphuric acid, and comprises the steps of feeding the sludge into a pre-dryer into which is fed a hot gas stream containing sulfur trioxide produced by the combustion and catalytic oxidation of sulfur with air and, finally, completely drying the sludge by feeding it into an ammoniator.

There are other processes which also use the heat generated by certain chemical reactions in order to dry and disinfect the sludge and to transform it into a saleable product.

1) Lime Sludge Treatment.

In this process, the calcium oxide is reacted with water contained in the sludge to be treated in order to obtain calcium hydroxide.

During the liming of the sludge, the pH and the mass temperature is raised to such levels that the complete destruction of the pathogenic and non-pathogenic microorganisms is guaranteed, and the product generated by the liming process is a good additive for acid soils.

In this process, for each ton of calcium hydroxide obtained, only 243 kg of water are fixed. Thus, for a complete drying of the sludge, 16 tons of calcium hydroxide are required to be added per ton of sludge.

2) Sulphuric Acid and Limestone Sludge Treatment.

In this process the limestone is reacted with sulphuric acid in order to obtain calcium sulfate, which when cooled, retains two crystallization water molecules and produces a hardening of the mass.

When the sludge is mixed with the sulphuric acid, the pH is lowered and the mass temperature is increased to such levels that the complete destruction of the pathogenic and nonpathogenic microorganisms is guaranteed and the product generated by the liming process is a good additive for alkaline soils.

In this process for each ton of gypsum obtained, there are fixed 309 kg of water and there are evaporated 100 kg of water. Thus, for a complete drying of the sludge, it is required to add 5.5 tons of sulphuric acid and 5.4 tons of limestone for each ton of humid sludge.

3) Ammoniacal and Sulphuric Acid Sludge Treatment.

With this treatment better results are achieved than with the sulphuric acid and limestone sludge treatment, since when the sulphuric acid is neutralized with ammonia instead of limestone, the product achieves the category of fertilizer and has a higher commercial value.

In this process, for each ton of ammonium sulfate obtained, 760 kgs of water are evaporated. Thus, for a complete drying of the sludge, 3.8 tons of sulphuric acid and 1.3 tons of ammonia are required to be added for each ton of humid sludge.

The treatment of the present invention surpasses the efficiency of the above referred treatments, since for each ton of ammonium sulfate produced, 2,500 kgs of water are evaporated by which all the energy of the exothermic reactions of the treatment of the present invention is used: the combustion of sulfur with air until sulfur dioxide is obtained, the oxidation of sulfur dioxide into sulfur trioxide, the reaction of the sulfur trioxide with water, and the reaction between ammonia and sulphuric acid.

Furthermore, the process of the present invention uses a non-elaborated raw material such as the sulfur, instead of a final product such as the sulphuric acid, thus improving the economy of the process.

SUMMARY OF THE INVENTION

It is therefore an object of the present invention, to provide a process for the treatment of sludge which follows the rules of the environmental laws.

It is also an object of the present invention to provide a process of the above-disclosed nature which generates a product having a sufficiently high commercial value.

It is another object of the present invention, to provide a process of the above-disclosed nature in which by each ton of ammonium sulfate produced, 2,500 kgs of water are evaporated, by which all the energy of the exothermic reactions of the treatment of the present invention is used, surpassing the efficiency of the process of the prior art.

It is yet a further object of the present invention, to provide a process of the above-disclosed nature which uses a non-elaborated raw material such as the sulfur, instead of a final product such as the sulphuric acid, thus improving the economy of the process.

These and other objects and advantages of the present invention will be apparent to those persons having ordinary skill in the art, from the following detailed description of the invention.

DETAILED DESCRIPTION OF THE INVENTION

The process for the treatment of sludge of the present invention will be described referring to a preferred embodiment thereof.

The process comprises the steps of:

a) mixing a sludge issuing from waste water treatment plants with a solution of formaldehyde alkalized with caustic soda having a pH of between about 8.0 and about 9.0 in an amount of about 3% to about 5% with respect to the total weight of the sludge, inside a mixer with a residence time of the sludge inside said mixer of about 10 to about 12 minutes, in order to eliminate all the microorganisms contained in the sludge;

b) adding to the resultant sludge of step a) sufficient urea to transform the residual formaldehyde on mono methylene urea in accordance with the following reaction:

$$CH_2O + (NH_2)_2CO \rightarrow (NH_2)_2C_2O + H_2O \qquad (1)$$

By the transformation of the residual formaldehyde on mono methylene urea, the formaldehyde is fixed and therefore its loss in subsequent steps of the process is avoided.

c) mixing the resultant sludge of step b) with a product containing ammonium sulfate and organic matter;

d) generating a hot gaseous stream containing sulfur trioxide by:

d1) generating a combustion of sulfur with dry air in order to obtain a gaseous mass containing about 8% to about 10% of sulfur dioxide and an excess of oxygen and nitrogen at a temperature of about 1,150° C.

d2) transferring the gaseous mass of step d1) to a recuperation boiler which cools the gaseous mass to a temperature of approximately 450° C.

d3) feeding the cooled gaseous mass to a catalytic bed operated with vanadium pentoxide as catalyst, in which a high percentage of sulfur dioxide is oxidized to sulfur trioxide in accordance with the reaction (2):

$$2SO_2 + O_2 \rightarrow 2SO_3 \quad (2)$$

Since the reaction #2 is exothermic, the temperature of the oxidized gases containing about 6.0 to about 12% of sulfur trioxide and sulfur dioxide is raised to 600° C.;

e) feeding the mix of step c) into a pre-dryer having a fines collector into which is fed the hot gaseous stream containing about 6.0% to about 12% of sulfur trioxide and sulfur dioxide, generated in step d). The sulfur dioxide contained in the hot gaseous stream also serves as an antiseptic. The water contained in the mix of step c) eases the transformation of part of the ammonium sulfate to acid ammonium sulfate when the ammonium sulfate reacts with sulfur trioxide in accordance with reaction (3):

$$SO_3 + H_2O + (NH_4)_2SO_4 \rightarrow 2NH_4SO_4 \quad (3)$$

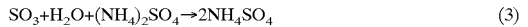

Most of the water contained in the mix is evaporated inside the pre-dryer as a result of the following:

Reaction (3) is highly exothermic and its heat is retired from the system by water evaporation.

Part of the water contained in the mix of step c) reacts with sulfur trioxide in accordance with reaction (3).

The hot gaseous stream containing sulfur trioxide is cooled to about 70° C. to about 80° C. due to an endothermic evaporation of part of the water contained in the mix of step c).

Part of the sulfur trioxide remains un-reacted (about 5% to about 7%) and exits from the pre-dryer together with sulfur dioxide and other gases such as water vapor.

As a result of the low pH and high temperature of the acid ammonium sulfate, it is guaranteed that no microorganisms will survive.

Inside the pre-dryer the polymerization of the mono methylene urea is also carried out, which adds nitrogen to the final product and favors an easy granulation of the sludge inside the pre-dryer.

f) recuperating fines from the fines collector and recycle them to the predryer;

g) feeding the gases issuing from the pre-dryer containing unreacted sulfur trioxide and small quantities of sulfur dioxide together with an ammonia stream coming from an ammoniator, wherein the ammonia reacts with the sulfur trioxide and forms ammonium sulfate in accordance with the reaction (4) and by this means excessive losses of sulfur trioxide are avoided. Liquids are collected and recycled to the reaction by means of a pump.

$$SO_3 + H_2O + 2NH_3 \rightarrow (NH_4)_2SO_4 \quad (4)$$

The sulfur dioxide is transformed to ammonium sulfite in accordance with reaction (5) which is then transformed to ammonium sulfate by feeding an additional stream of chloride or oxygenated water in order to avoid the emission of sulfur dioxide and hydrosulphuric acid to the environment.

$$SO_2 + 2NH_3 + H_2O \rightarrow 2(NH_4)_2SO_3 \quad (5)$$

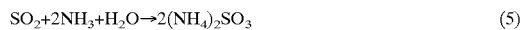

In order to achieve better control of the process, the adding of additional ammonia from external sources is foreseen.

h) discharging the granulated sludge to an ammoniator wherein the acid ammonium sulfate reacts with ammonia in order to obtain ammonium sulfate in accordance with the reaction (6).

$$NH_4HSO_4 + NH_3 \rightarrow (NH_4)2SO_4 \quad (6)$$

Reaction (6) is highly exothermic and the heat produced is retired from the system by the evaporation of the remaining water of the granulated sludge thus completing the drying process.

The ammoniator operates with an excess of ammonia, which is fed to step g).

The final product comprises a granulated fertilizer having nitrogen which can be easily assimilated by plants.

What is claimed is:

1. A process for the treatment of sludge issuing from waste water treatment plants, containing less than 85% of water, comprising the steps of:

a) mixing the sludge with a solution of formaldehyde alkalized with an effective amount of caustic soda, inside a mixer in order to eliminate all the microorgamsms contained in the sludge;

b) adding to the resultant sludge of step a) sufficient urea to transform residual formaldehyde to mono methylene urea;

c) mixing the resultant sludge of step b) with a product containing ammonium sulfate and organic matter;

d) feeding the mix of step c) into a pre-dryer including an exit connected to a fines collector, into which is fed a hot gaseous stream containing sulfur trioxide and sulfur dioxide in order to polymerize the mono methylene urea contained in the mix of step c) to yield a resin rich in nitrogen and resulting in an exothermic reaction between the gaseous sulfur trioxide, the water, and the ammonium sulfate contained in the mix of step c) by means of which the ammonium sulfate is transformed into acid ammonium sulfate and part of the water contained in the mix of step c) reacts with the sulfur trioxide and another part of the water is evaporated by the heat of said exothermic reaction thus obtaining a semi-dried sludge; and e) feeding the semi-dried sludge of step d) to an ammoniator operating with an excess of ammonia into which the remaining water Contained in the semi-dried sludge of step d) is evaporated by an exothermic reaction between the ammonia and the acid ammonium sulfate contained in the semi-dried sludge of step d) which is transformed to ammonium sulfate thus obtaining a dry sludge free of pathogenic and non pathogenic microorganisms enriched with nitrogen.

2. The process as claimed in claim 1, wherein the solution of formaldehyde alkalized with caustic soda has a pH of between about 8.0 and about 9.0.

3. The process as claimed in claim 1, wherein the solution of formaldehyde alkalized with caustic soda is added to the sludge in an amount of about 3% to about 5% with respect to the total weight of the sludge.

4. The process as claimed in claim 1, wherein the step a) is carried out inside a mixer with a residence time of the sludge inside the mixer of about 10 to about 12 minutes.

5. The process as claimed in claim 1, wherein the hot gaseous stream of step d) is generated by:

generating a combustion of sulfur with dry air in order to obtain a gaseous mass containing about 8% to about 10% of sulfur dioxide and an excess of oxygen and nitrogen at a temperature of 1,150° C.;

transferring the gaseous mass to a recuperation boiler which cools the gaseous mass to a temperature of approximately 450° C.; and feeding the cooled gaseous mass to a catalytic bed operated with vanadium pentoxide as catalyst, in which sulfur dioxide is oxidized to sulfur trioxide and the temperature of the oxidized gases containing about 6.0 to about 12% of sulfur trioxide is raised to about 600° C.

6. The process as claimed in claim 1, wherein the exit of the pre-dryer includes a fines collector which collects fines to be recycled to the pre-dryer.

7. The process as claimed in claim 1, wherein the hot gaseous stream contains about 6.0% to about 12% of sulfur trioxide.

8. The process as claimed in claim 1, wherein about 5% to about 7% of the sulfur trioxide fed to the pre-drier remains unreacted and exits the pre-dryer together with the sulfur dioxide and other gases such as water vapor.

9. The process as claimed in claim 8 wherein the unreacted sulfur trioxide, sulfur dioxide and other gases issuing from the pre-dryer are reacted with ammonia to obtain ammonium sulfate and avoid losses of the sulfur trioxide and to fix the sulfur dioxide in the form of ammonium sulfite which is then transformed to ammonium sulfate by feeding an additional stream of chloride or oxygenated water in order to avoid the emission of sulfur dioxide and hydrosulphuric acid to the atmosphere.

10. The process as claimed in claim 9, wherein liquids are collected and recycled to the reaction of the ammonia and sulfur trioxide by means of a pump.

11. The process as claimed in claim 9, wherein the excess ammonia from the ammoniator is reacted with the sulfur trioxide.

* * * * *